Aug. 11, 1970 U. BUZZI ET AL 3,524,176

MAGNETIC INFORMATION STORAGE CARRIER WITH INDIVIDUAL STORAGE ELEMENTS

Filed Dec. 6, 1967 2 Sheets-Sheet 1

United States Patent Office 3,524,176
Patented Aug. 11, 1970

3,524,176

MAGNETIC INFORMATION STORAGE CARRIER WITH INDIVIDUAL STORAGE ELEMENTS

Ugo Buzzi, Zug, and Bruno Gemperle, Steinhausen, Switzerland, assignors to Anstalt Europaische Handelsgesellschaft, Vaduz, Liechtenstein Filed Dec. 6, 1967, Ser. No. 688,383
Claims priority, application Switzerland, Jan. 25, 1967, 1,107/67
Int. Cl. G11b *5/02, 5/76;* G11c *11/02*
U.S. Cl. 340—174.1 7 Claims

ABSTRACT OF THE DISCLOSURE

This information storage device comprises a number of distinct magnetizable storage elements on an element carrier and one or several read-out and read-in places, the element carrier and the reading places being movable relatively to each other. Control members are associated with the read-out places and are directly operable magnetically by the storage elements, without picking up the stored information by the detour of inducing electric pulses which are to be amplified to actuate the control members. The read-in places comprise a coil acting on the storage elements and energized by a pulse generator. The element carrier is formed by a rotatable annular member having storage elements inserted into its inner or outer cylindrical wall or into its plane end faces. The control members are formed by reed switches or by magnetic valves.

Figure 1:
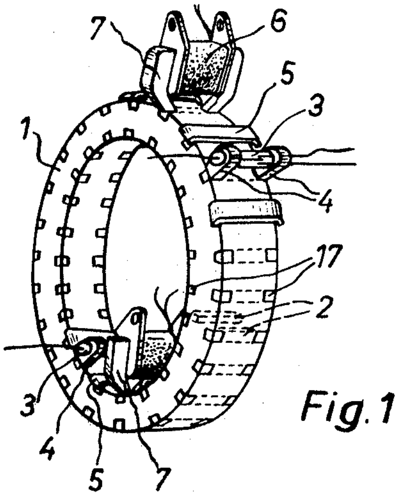

The present invention relates to magnetic information storage devices of the kind having a number of distinct magnetizable storage elements on an element carrier, and at least one read-out place and read-in place which are movable relatively to the element carrier.

Information storage devices are often used as storing stages in connection with larger control apparatus to effect storage of a determined information programme and to retransmit the programme according to requirements of the control apparatus. Upon such retransmission the stored information can be removed from the storage device or cancelled, or also it can be read only, while leaving the information in the storage device.

Today a magnetizable material is generally used as information carrier, which material appears as distinct storage elements (e.g. magnet core storage devices having as a rule annular magnet cores distributed in matrices and traversed by current conductors) or as a continuous magnetizable medium (e.g. tapes, wires, sheets, discs, or drums).

Most of the known storage devices are very suitable for storing an extraordinary great amount of bits and for recording and reproducing them in very short periods. The actual tendency of development generally is aiming to increase the capacity of such storage devices and to reduce the processing times. This development, however, is so to speak forcibly associated with a reduction of the stored magnetic energy in the known devices. The small stored energy, however, does not suffice to directly actuate a control member in the control equipment. For this reason amplifier arrangements are associated with the reading place in practically all known storage devices, in order to amplify the pulse picked-up induction from the information carrier, which pulse is very weak due to the small stored energy.

On the other hand, there are a great many fields of application for storage devices which do not require a very large storage capacity nor an extremely short processing time. The actual tendency of development of the storing devices still increases these fields of application for moderate requirements. Accordingly, it would be an uneconomical expenditure to provide known information storage devices for cases in which small capacity is sufficient and processing time is not critical.

It is an object of the invention to provide a magnetic information storage device which substantially avoids these drawbacks and fills the above mentioned gap of commodities. According to the invention an information storage device of the above mentioned kind comprises control members associated with said reading place and which are directly operable magnetically by distinct storage elements. These control members can be formed by reed switches the contact rating of which corresponding substantially to that of a conventional electromagnetic relay and accordingly, as a rule, is sufficient for effecting direct control. The control members can also be formed by magnetic valves which control the flow of a pressure medium.

In any case, in the information storage device according to the invention the information stored in the storage elements is not picked up by the detour of inducing an electric pulse which, upon amplification, actuates the proper control member proper of the read-out place, but by directly actuating the control members.

It will be understood that a sufficiently high energy must be stored in the storage elements in order to actuate the control members, which fact determines the minimum size of the storage elements for any specific case and according to the material available for the elements. This requirement, however, in no case is a drawback when considering the particular fields of application of the proposed storage devices and particularly in view of the elimination of expensive amplifying equipment.

The accompanying drawings illustrate by way of example some embodiments of the invention.

Figure 2:
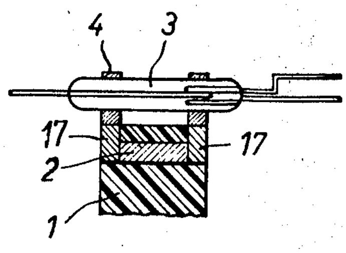
Figure 3:
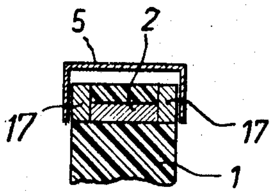
Figure 4:
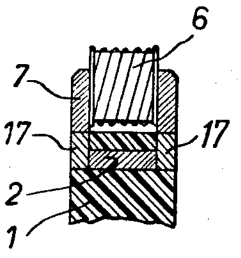
Figure 5:
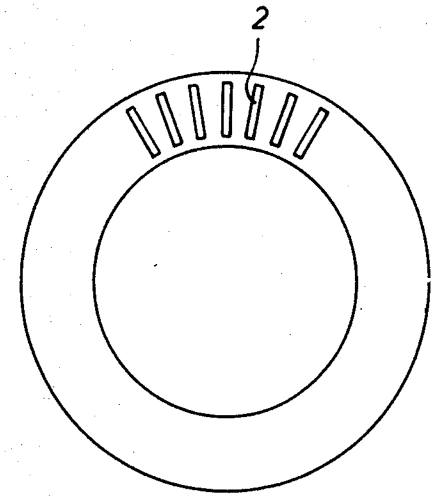
Figure 6:
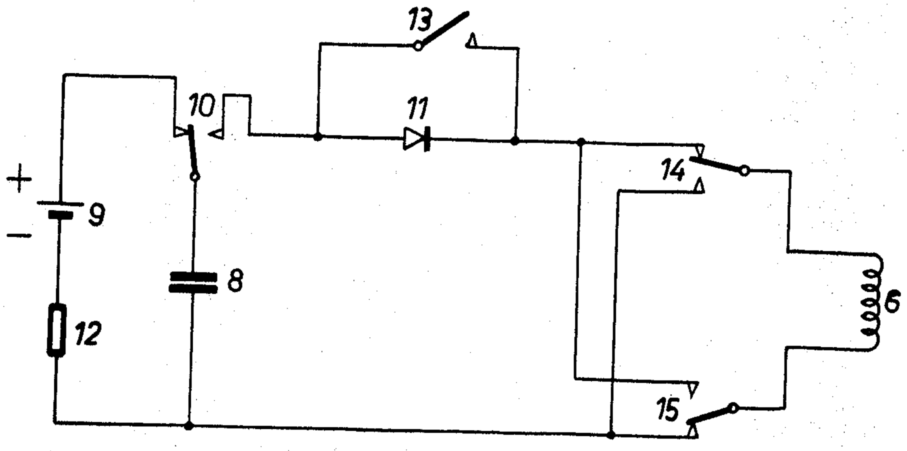
Figure 7:
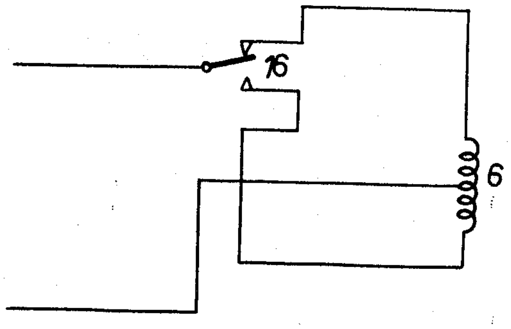

FIG. 1 shows in perspective view a first embodiment of an information storage device, all nonessential parts having been omitted, FIG. 2 is a diagrammatic sectional view of one of the read-out places of the storage device of FIG. 1, FIG. 3 is a diagrammatic sectional view of that portion of the storage device according to FIG. 1 at which the storage elements are shielded by a magnetic short-circuit bridge, FIG. 4 is a diagrammatic sectional view of one of the input or read-in places of the storage device according to FIG. 1, FIG. 5 represents diagrammatically a modification of an element carrier, FIG. 6 is a circuit diagram of the supply circuit of an energizing coil at a read-in place, FIG. 7 shows a modification of the circuit according to FIG. 6.

The information storage device represented in FIGS. 1–5 comprises an annular, rotatable element carrier 1, having a number of storage elements inserted at regular angularly spaced intervals into its cylindrical inner and outer shell surface (FIG. 1) or into its plane end faces (FIG. 5).

In the embodiment shown these storage elements are magnetizable rods 2 having their ends abutting against pole pieces 17 which concentrate the magnetic field of the rods 2 on the side of the carrier facing the read-out or the read-in place.

In the represented embodiment the read-out place consists of one or several reed switches 3 having contacts placed in a protective gas atmosphere. The switches 3 also carry two pole pieces 4 matching the pole pieces 17, in order to reduce the leakage field of the magnetic circuit formed by the rod 2, the pole pieces 17, the pole pieces 4 and the contact portion of the reed switch 3 to a minimum value.

The storage elements situated directly ahead of and in the rear of the read-outs place (FIG. 1) are bridged by means of magnetic short-circuiting bars 5, in order to shield the storing elements against the action of stray fields.

The represented information storage device comprises an input or read-in place (FIGS. 1 and 4) which comprises a coil 6 having a U-shaped yoke 7. The magnetic circuit of the injection coil 6 is closed by that storage element which is situated in the range of the yoke 7. The coil of course is connected to a power source which has been omitted in FIGS. 1 and 4 for the sake of simplicity, which will be, however, described more in detail hereinafter, by reference to FIGS. 6 and 7.

Coming back to the input places equipped with a coil 6, it is to be mentioned that the coil, can be fed for example with direct current pulses, whereby according to the polarity of the pulses, the storage of two different binary units can be obtained. The same or, according to requirements, a further coil, spaced for one or several indexing steps from the first coil, can be fed with fading alternating pulses and thereby used for cancellation, since the storage element affected thereby will be demagnetized, i.e. brought into the condition "0." For reading out as well as for reading-in preferably a step-by-step relative movement is then produced between the element carrier 1 and the read-in and read-out places, so that at certain timed intervals the storage elements are situated precisely at the information storing places. It is therefore possible, according to the manner of operation, to work in a binary or trinary system, since in the first case +1 or —1, and 0 respectively, serves as two information values, in the other case +1, 0 and —1 serve each as one of three values.

The pulse energizing the coil preferably is produced by means of a pulse generator having e.g. a storage capacitor which is charged at intervals and then discharged producing relatively short and high intensity current pulses.

In FIG. 6 such a pulse generator is represented by way of example, coil 6 being again shown. The energy to be stored is supplied by a DC power source such as a battery 9 to a capacitor 8 via a commutator 10. A diode 11 serves to prevent oscillation which may occur during discharge of the capacitor 8. In the left switching position of the movable contact of commutator 10, the battery 9 charges again the capacitor via a charging resistance 12.

When the switch 13 is closed, it is possible to produce a fading oscillation since the inductivity of the coil 6 and the capacity of the capacitor 8 form an oscillatory circuit, said fading oscillation will start at the moment the commutator 10 is thrown to the right (FIG. 6). In this case the coil 6 serves as erasing coil for the purpose of demagnetizing a storage element, i.e. to bring it to the condition "0." In a trinary system the demagnetization of a storage element correspond to a read-in function, since it reads-in the information "0." The informations "+1" and "—1" then will be read-in by simultaneous reversing of the switches 14 and 15 and opening switch 13. As shown in FIG. 7, the switches 14 and 15 can be replaced by a single switch 16 when using a coil 6 having center tapping.

The reed switches 3 of the reading places mentioned in the described example can be replaced in practice also by any magnetically operable, control members, e.g. magnetically operable control valves or the like.

Moreover, the element carrier can also have another shape than that of the illustrated ring. The element carrier can for example be formed by a flexible endless member, resembling a conveyor belt which carries the storage elements, guides being provided for guiding the flexible member at least in the range of the read-in and the read-out places.

What is claimed is:

1. In a magnetic storage device:
an element carrier;
a plurality of distinct information storage elements disposed in regular spaced relationship on said element carrier, each of said storage elements defining one of three mganetic conditions, namely magnetized in one direction, magnetized in the other direction, and demagnetized;
means defining a read-out place, said read-out place comprising at least one magnetically operable control means;
means defining a read-in place, said read-in place comprising at least one read-in coil; energizing means connected to said read-in coil to selectively energize said read-in coil; and wherein
said energizing means comprising an impulse generator having a DC power source, capacitor means connectable therewith, output line means from said capacitor means, and selectively shuntable rectifier means connected in series in said output line means.

2. The magnetic apparatus according to claim 1, including switching means operatively connected to said capacitor output line means for selectively reversing the polarity of said output line means.

3. The magnetic apparatus according to claim 1, wherein said storage elements are of the permanent magnet type and are removable from said element carrier and insertable therein in different positions.

4. The magnetic apparatus according to claim 1, including short-circuiting bridges provided in the range of the read-out place for the storage elements situated in this range, in order to shield said elements against magnetic leakage fields.

5. The magnetic apparatus according to claim 1 in which at least a part of said control means of said read-out place is formed by reed switches having at least one magnetically movable contact portion.

6. The magnetic apparatus according to claim 1 in which at least a part of said control means of said read-out place is formed by magnetically operated valves for a pressure medium.

7. The magnetic apparatus according to claim 1, wherein the element carrier comprises at least one ring on which are disposed at least one set of storage elements at uniform angular spaces, said ring being rotatable in a step-by-step motion with respect to the read-out place about the axis of the ring.

References Cited

UNITED STATES PATENTS

| | | | |
|---|---|---|---|
| 2,804,506 | 8/1957 | Schurch et al. | 179—100.2 |
| 2,914,756 | 11/1959 | Heidenhaim et al. | 179—100.2 |
| 3,032,765 | 5/1962 | Begun et al. | 179—100.2 |
| 3,049,697 | 8/1962 | Slattery et al. | 340—174.1 |
| 3,176,241 | 3/1965 | Hogan et al. | 340—174.1 |
| 3,246,219 | 4/1966 | Devol et al. | 179—100.2 |
| 3,370,278 | 2/1968 | Hendrickx | 340—174.1 |
| 2,770,796 | 11/1956 | Boer | 340—174.1 |

BERNARD KONICK, Primary Examiner

V. P. CANNEY, Assistant Examiner

U.S. Cl. X.R.

340—174; 346—74